Feb. 10, 1925.
R. H. MARVIN
INSULATOR LINK
Filed April 13, 1921
1,526,168
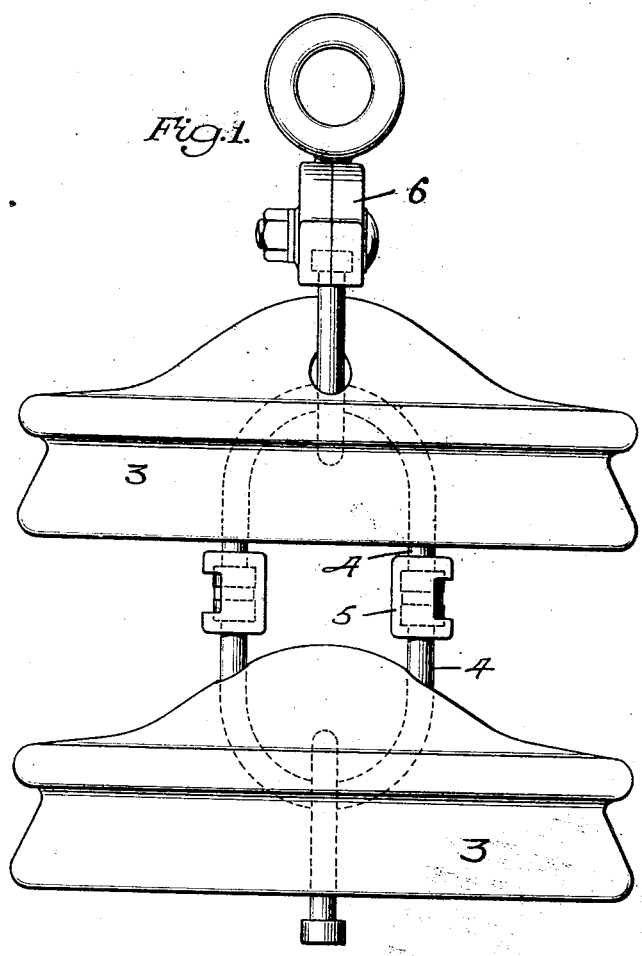
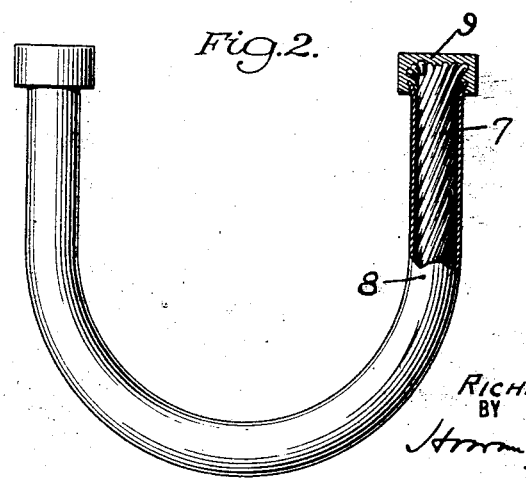
INVENTOR
RICHARD H. MARVIN
BY
his ATTORNEYS Patented Feb. 10, 1925.

1,526,168

UNITED STATES PATENT OFFICE.

RICHARD H. MARVIN, OF EAST LIVERPOOL, OHIO, ASSIGNOR TO THE R. THOMAS & SONS COMPANY, OF EAST LIVERPOOL, OHIO, A CORPORATION OF OHIO.

INSULATOR LINK.

Application filed April 13, 1921. Serial No. 460,936.

*To all whom it may concern:*

Be it known that I, RICHARD H. MARVIN, a citizen of the United States of America, residing at East Liverpool, in the county of Columbiana and State of Ohio, have invented certain new and useful Improvements in Insulator Links, of which the following is a specification.

My invention relates to insulator links, and particularly to links for connecting suspension insulator units either to adjacent units, or to end fittings. The object of my invention is to provide a link which combines great tensile strength with pliability, and an exterior which is not only smooth but also relatively soft, so that it will follow the irregularities in the porcelain of the insulator with which it is used.

In the accompanying drawing—

Fig. 1 is a side elevation of a suspension insulator with which links embodying my invention are associated; and Fig. 2 is a broken side elevation of a detached link, drawn to a larger scale.

A type of suspension insulator with which a link of the present construction may be used is shown in Fig. 1, in which two Hewlett insulator units 3 are connected together by a pair of links 4 and their intermediate fittings 5, while the top insulator unit is connected by another link to the suspension fitting 6. Links of insulators of this type have heretofore comprised either copper rods bent to shape and headed, or cables used with appropriate fittings.

The present invention is confined to an improved construction of link. Briefly described, it comprises, as here shown, a flexible center or core 7 of metal strands, preferably of high tensile strength, the core being encased in a smooth tubular cover or sheath 8 of soft metal, such as copper, and provided with a head 9 cast or welded to the body of the link.

There are various ways in which the structure may be manufactured. Thus, the core 7 may be of stranded copper wire or of some stronger or cheaper metal, such for example as brass, steel or suitable alloy, which, while affording a core of great tensile strength, is at the same time of greater flexibility than the copper rods now generally used.

The core may be pulled into a tight fitting tube or sheath 8, or the tube may be initially of greater internal diameter than the core upon which it is then swaged down. Again, the tubular cover may be formed by bending a strip or strips around the core and welding, soldering or fusing the edges of the strips together to form the enclosing sheath. In any case, the sheath or cover is of relatively soft metal so that it may fit itself to the irregularities of the porcelain and thus distribute evenly through the insulator the strains imposed thereon. The smooth exterior prevents ice accumulations from becoming locked to the link. Obviously the cover is of relatively slight tensile strength, the latter being afforded by the core element 7.

The head of the link may be formed in various ways. If the core and cover are of copper, the head my be formed by welding solid bar metal to the end of the link and then upsetting the solid bar metal, producing an appearance substantially like that shown in Fig. 2. Alternatively, the ends of the core and cover may be tinned and flared as shown, and the metal of the head 9 may then be cast around these flared ends.

Various modifications of the construction will occur to those dealing with the problem, while still accomplishing the ends and objects of what I claim as my invention. My underlying thought is to provide a flexible core element which affords the tensile strength of the link, a relatively soft metal, smooth cover or sheath therefor, and a head formed at the ends of the link to afford an anchoring device by which the link may be connected to an intermediate or end fitting for the insulator.

I claim—

1. An insulator link comprising a stranded core, heads at opposite ends of the core and a tubular sheath encasing the core and embedded in the heads at opposite ends of the link.

2. An insulator link comprising a stranded core, heads at opposite ends of the core and a soft metal tubular sheath encasing the core and embedded in the heads at opposite ends of the link.

3. An insulator link comprising a stranded core, heads at opposite ends of the core and a soft metal tubular sheath of smooth exterior encasing the core and embedded in the heads at opposite ends of the link.

4. An insulator link comprising a flexible core member of great tensile strength and relatively hard, rough exterior, heads of materially greater diameter at its opposite ends and rigid therewith, in combination with a soft metal sheath encasing said core at all points between said heads and secured in position thereby, said sheath affording a smooth, relatively soft casing for the body of the link.

5. An insulator link, comprising a flexible core, a smooth soft metal sheath therefor, and a head in which the end of said core and sheath are embedded.

6. An insulator link, comprising a flexible core, a smooth soft metal sheath therefor, and a head in which the end of said core and sheath are flared and embedded.

In testimony whereof I have signed my name to this specification.

RICHARD H. MARVIN.